US008086623B2

(12) United States Patent  
Dettinger et al.

(10) Patent No.: US 8,086,623 B2  
(45) Date of Patent: *Dec. 27, 2011

(54) CONTEXT-SENSITIVE TERM EXPANSION WITH MULTIPLE LEVELS OF EXPANSION

(75) Inventors: Richard D. Dettinger, Rochester, MN (US); David G. Herbeck, Rochester, MN (US); Jeffrey W. Tenner, Rochester, MN (US); Eric W. Will, Oronoco, MN (US); Christopher Chute, Rochester, MN (US); James Buntrock, Rochester, MN (US); Serguei Pakhomov, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 12/613,754

(22) Filed: Nov. 6, 2009

(65) Prior Publication Data

US 2010/0057811 A1     Mar. 4, 2010

Related U.S. Application Data

(63) Continuation of application No. 10/691,308, filed on Oct. 22, 2003, now Pat. No. 7,617,196.

(51) Int. Cl.  
    *G06F 17/30*     (2006.01)  
(52) U.S. Cl. ........ 707/766; 707/759; 707/767; 707/783; 707/784  
(58) Field of Classification Search .................. 707/759, 707/765, 766, 767, 783, 784  
See application file for complete search history.

(56) References Cited

U.S. PATENT DOCUMENTS

| | | | |
|---|---|---|---|
| 5,253,362 A | 10/1993 | Nolan et al. |
| 5,309,359 A | 5/1994 | Katz et al. |
| 5,734,887 A | 3/1998 | Kingberg et al. |
| 5,761,429 A | 6/1998 | Thompson |
| RE35,861 E | 7/1998 | Queen |
| 5,940,821 A | 8/1999 | Wical |
| 6,038,560 A | 3/2000 | Wical |
| 6,226,638 B1 | 5/2001 | Okura et al. |
| 6,226,792 B1 | 5/2001 | Goiffon et al. |
| 6,272,488 B1 | 8/2001 | Chang et al. |
| 6,336,124 B1 | 1/2002 | Alam et al. |
| 6,411,950 B1 | 6/2002 | Moricz et al. |
| 6,421,675 B1 | 7/2002 | Ryan et al. |
| 6,453,312 B1 | 9/2002 | Goiffon et al. |
| 6,460,034 B1 | 10/2002 | Wical |
| 6,493,721 B1 | 12/2002 | Getchius et al. |
| 6,519,592 B1 | 2/2003 | Getchius et al. |

(Continued)

OTHER PUBLICATIONS

Christopher G. Chute, Mayo U.S. Appl. No. 10/638,270, filed Aug. 7, 2003, "Information Retrieval Using Vertical and Horizontal Query Expansion".

(Continued)

*Primary Examiner* — Khanh Pham  
(74) *Attorney, Agent, or Firm* — Patterson & Sheridan LLP

(57) ABSTRACT

Articles of manufacture and systems for searching collections of data using context sensitive expanded term searching are provided. The collection of data may be a relational database, text document, or any other type of searchable collection of data. In either case, a query including a search condition based on a specified search term may be modified to include additional conditions based on a set of expanded (e.g., conceptually-related) search terms. For some embodiments, a user may be given the ability to control the level of expansion and the context in which the terms may be expanded.

21 Claims, 11 Drawing Sheets

U.S. PATENT DOCUMENTS

| | | |
|---|---|---|
| 6,519,603 B1 | 2/2003 | Bays et al. |
| 6,523,028 B1 | 2/2003 | DiDomizio et al. |
| 6,549,922 B1 | 4/2003 | Srivastava et al. |
| 6,553,368 B2 | 4/2003 | Martin et al. |
| 6,571,295 B1 | 5/2003 | Sidana |
| 6,594,669 B2 | 7/2003 | Asami et al. |
| 6,665,681 B1 | 12/2003 | Vogel |
| 6,725,227 B1 | 4/2004 | Li |
| 6,826,559 B1 | 11/2004 | Ponte |
| 6,847,384 B1 | 1/2005 | Sabadell et al. |
| 6,871,318 B1 | 3/2005 | Wynblatt et al. |
| 6,910,188 B2 | 6/2005 | Keohane et al. |
| 6,928,431 B2 | 8/2005 | Dettinger et al. |
| 6,954,748 B2 | 10/2005 | Dettinger et al. |
| 6,956,593 B1 | 10/2005 | Gupta et al. |
| 6,996,558 B2 | 2/2006 | Dettinger et al. |
| 6,999,959 B1 | 2/2006 | Lawrence et al. |
| 7,013,307 B2 | 3/2006 | Bays et al. |
| 7,020,848 B2 | 3/2006 | Rosenzweig et al. |
| 7,092,936 B1 | 8/2006 | Alonso et al. |
| 7,096,229 B2 | 8/2006 | Dettinger et al. |
| 7,152,072 B2 | 12/2006 | Dobrowski et al. |
| 7,162,691 B1 | 1/2007 | Chatterjee et al. |
| 7,194,483 B1 | 3/2007 | Mohan et al. |
| 7,315,857 B2 | 1/2008 | Dettinger et al. |
| 7,392,267 B2 | 6/2008 | Cragun et al. |
| 7,593,929 B2 | 9/2009 | Dettinger et al. |
| 7,617,196 B2 | 11/2009 | Dettinger et al. |
| 7,689,578 B2 | 3/2010 | Albornoz et al. |
| 7,752,197 B2 | 7/2010 | Dettinger et al. |
| 2002/0078068 A1 | 6/2002 | Krishnaprasad et al. |
| 2002/0124018 A1 | 9/2002 | Fifield et al. |
| 2002/0143860 A1 | 10/2002 | Catan |
| 2003/0061028 A1 | 3/2003 | Dey et al. |
| 2003/0069881 A1 | 4/2003 | Huttunen |
| 2003/0074375 A1 | 4/2003 | Nakamura et al. |
| 2003/0145281 A1 | 7/2003 | Thames et al. |
| 2003/0204759 A1 | 10/2003 | Singh |
| 2004/0068489 A1 | 4/2004 | Dettinger et al. |
| 2004/0150669 A1 | 8/2004 | Sabiers et al. |
| 2004/0163042 A1 | 8/2004 | Altman |
| 2004/0192343 A1 | 9/2004 | Toyama |
| 2004/0205514 A1 | 10/2004 | Sommerer et al. |
| 2004/0205545 A1 | 10/2004 | Bargeron et al. |
| 2004/0260714 A1 | 12/2004 | Chatterjee et al. |
| 2004/0260717 A1 | 12/2004 | Albornoz et al. |
| 2004/0267798 A1 | 12/2004 | Chatterjee et al. |
| 2005/0039123 A1 | 2/2005 | Kuchinsky et al. |
| 2005/0125447 A1 | 6/2005 | Cragun et al. |
| 2005/0203876 A1 | 9/2005 | Cragun et al. |
| 2005/0256867 A1 | 11/2005 | Walther et al. |
| 2006/0080598 A1 | 4/2006 | Bargeron et al. |
| 2007/0271249 A1 | 11/2007 | Cragun et al. |

OTHER PUBLICATIONS

Naser Barghouti et al., "Improvise—a process modeling interface with multimedia graph diagrams," Electronic Proceedings of the ACM Workshop on Effective Abstractions in Multimedia; Layout, Presentation, and Interaction in association with ACM Multimedia '95, 1995: pp. 1-5, < http://www.cs.uic.edu/~ifc/mmwsproc/north/north.html>.

Office Action History of U.S. Appl. No. 10/083,075 from Nov. 26, 2004 to Sep. 1, 2005.

Office Action History of U.S. Appl. No. 10/264,188 from Mar. 4, 2005 to Jun. 16, 2010.

Office Action History of U.S. Appl. No. 10/310,192 from Jun. 30, 2005 to Jun. 4, 2008.

Office Action History of U.S. Appl. No. 11/944,987 from Oct. 14, 2010 to Apr. 8, 2011.

Office Action of U.S. Appl. No. 12/113,079 dated Jul. 6, 2011.

Office Action History of U.S. Appl. No. 10/600,382 from Mar. 9, 2006 to Sep. 18, 2009.

Office Action History of U.S. Appl. No. 11/833,884 from Sep. 8, 2009 to Sep. 21, 2010.

Office Action History of U.S. Appl. No. 10/731,079 from May 31, 2006 to Jun. 10, 2011.

Office Action History of U.S. Appl. No. 10/728,288 from Jun. 28, 2006 to Apr. 23, 2008.

Office Action History of U.S. Appl. No. 12/119,691 from Aug. 17, 2010 to May 6, 2011.

Office Action History of U.S. Appl. No. 10/728,288 from Dec. 16, 2005 to Jan. 13, 2010.

Office Action History of U.S. Appl. No. 10/691,415 from Apr. 27, 2006 to Sep. 2, 2009.

Office Action of U.S. Appl. No. 12/564,383 from Apr. 27, 2006 to Apr. 29, 2011.

Office Action History of U.S. Appl. No. 10/691,308 from Mar. 31, 2006 to Oct. 21, 2009.

Office Action History of U.S. Appl. No. 10/845,501 from Nov. 1, 2006 to Dec. 12, 2007.

Office Action History of U.S. Appl. No. 11/870,284 from Dec. 11, 2009 to Apr. 7, 2010.

Office Action History of U.S. Appl. No. 10/845,387 from Jul. 28, 2006 to Feb. 17, 2011.

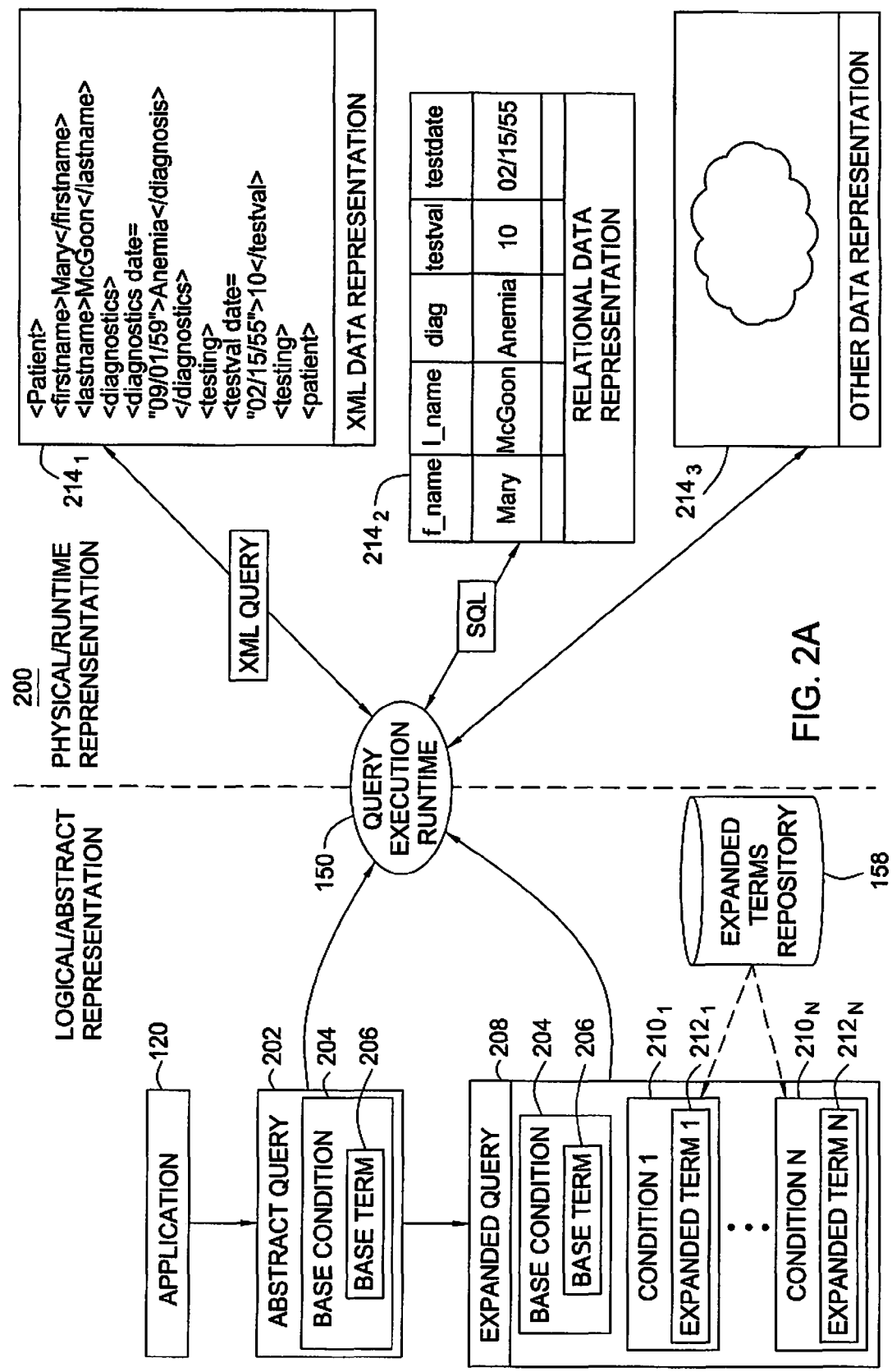

EXPANDED TERMS
BASE TERM : CANCER

LOW EXPANSION LEVEL :
- TUMOR
- CANCEROUS

HIGH EXPANSION LEVEL :
- TUMOR
- MALIGNANT
- CANCEROUS
- GROWTH
- MALIGNANCY

FIG. 2C

| API FUNCTION | DESCRIPTION |
|---|---|
| GET EXPANSION LEVELS | GIVEN A SEARCH TERM, RETURNS THE LEVELS OF EXPANSION ALLOWED |
| GET EXPANDED TERMS | GIVEN A SEARCH TERM AND EXPANSION LEVEL, RETURNS A SET OF EXPANDED TERMS |
| BUILD EXPANDED TERMS | GIVEN A SEARCH TERM AND EXPANSION LEVEL, ADDS A LIST OF EXPANDED TERMS TO THE REPOSITORY |
| ADD EXPANDED TERMS | GIVEN A SEARCH TERM AND EXPANSION LEVEL, ALLOWS SPECIFIED TERMS TO BE ADDED TO AN EXISTING SET OF EXPANDED TERMS |
| DELETE TERM | GIVEN A SEARCH TERM AND EXPANSION LEVEL, ALLOWS SPECIFIED TERMS TO BE DELETED FROM AN EXISTING SET OF EXPANDED TERMS |

FIG. 4

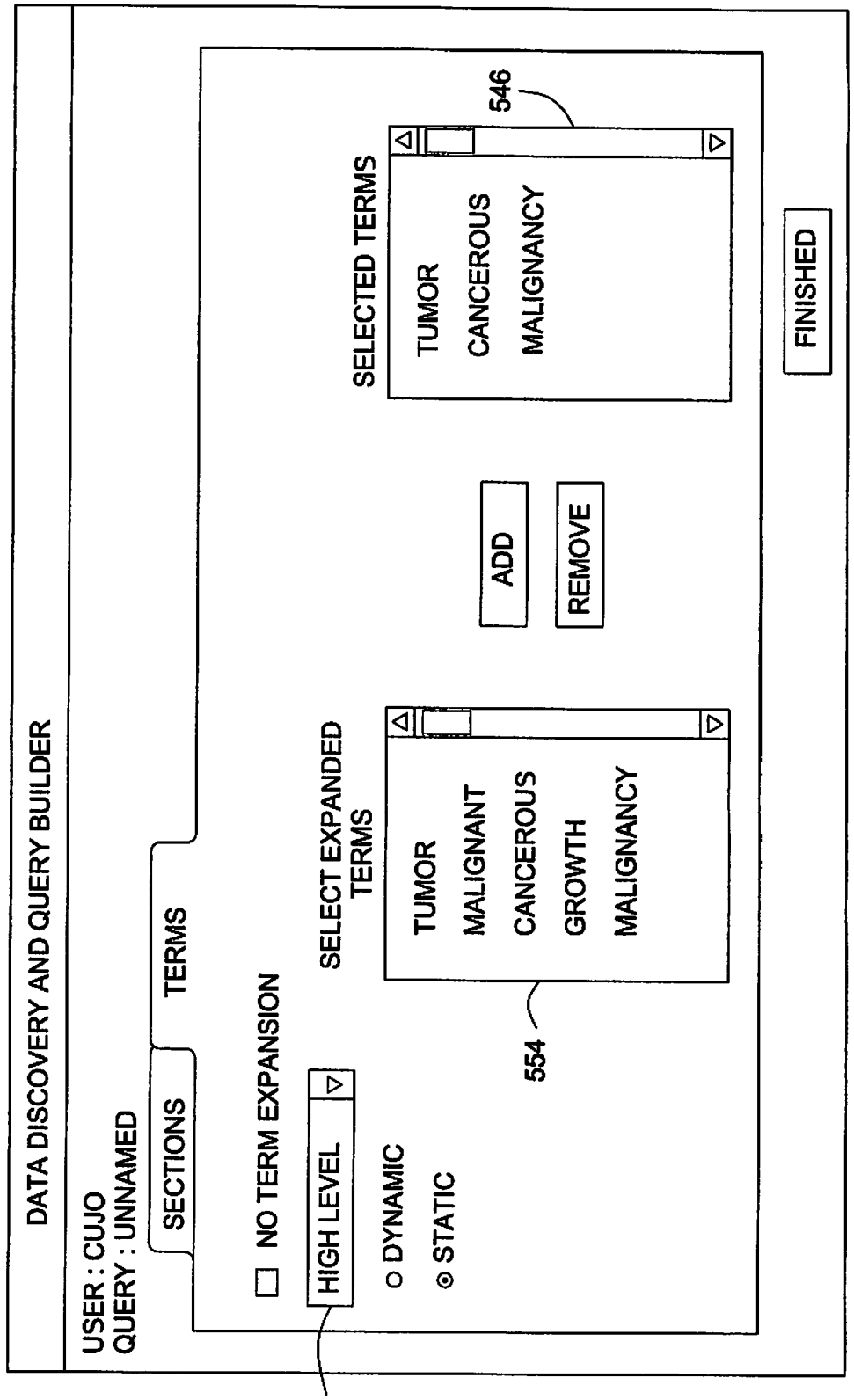

CONTEXT-SENSITIVE TERM EXPANSION WITH MULTIPLE LEVELS OF EXPANSION

CROSS-REFERENCE TO RELATED APPLICATIONS

This application is a continuation of U.S. patent application Ser. No. 10/691,308, field Oct. 22, 2003, now U.S. Pat. No. 7,617,196, which is herein incorporated by reference in its entirety.

This application is related to U.S. Pat. No. 6,996,558, entitled "Application Portability And Extensibility Through Database Schema And Query Abstraction," issued on Feb. 7, 2006 and application Ser. No. 10/264,188, entitled "SQL Query Construction Using Durable Query Components", filed Oct. 3, 2002, now U.S. Pat. No. 7,752,197.

BACKGROUND OF THE INVENTION

1. Field of the Invention

The present invention generally relates to data processing and more particularly to searching text, or other type data fields, using automatically expanded search terms.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, in a DBMS, a requesting entity (e.g., an application or the operating system) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL). Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database. Queries take the form of a command language that lets programmers and programs select, insert, update, find out the location of data, and so forth.

One example of a query used extensively is a command for searching data, or a request to return data stored in the database, given a specific search term. One of the problems faced by data searching applications is that of finding a concept with a search criteria. The common query condition for searching a field containing a specific term is based on a specific value (e.g., diagnosis="colon cancer"), rather than a concept. Value searches work well in cases where the data is relational in nature, for example, where a discrete set of known values are stored in discrete rows and columns within a tabular format. This type of searching breaks down, however, when you are interested in finding information stored in a free text or open format, such as a textual document or text field of a database. For example, a doctor's notes may have several paragraphs of written information for each time a patient visits the doctor. Searching this data with the above condition will obviously not work, as the notes will likely contain additional text, rather than a specific value. In some cases, wildcards may be used to specify that the field should be returned if a specified value is found anywhere within the field. However, this approach may still present problems. For example, if the specified value spans the end of a line, in many data formats, the value to not be found.

Another, possibly more significant problem is that, in free text information, the preparers of the information are free to describe things as they see fit, using their preferred terms. As an example, if a doctor has chosen to write in his notes "cancer of the colon", "colon malignancy", or any other descriptive phrases, the field would not be found by searching for "colon cancer". This is unfortunate, as a user searching for information regarding colon cancer would likely be interested in retrieving and reviewing these notes.

Accordingly, there is a need for an improved and more flexible method for searching fields, such as text fields, preferably that allows conditions based on a single specified search term to be expanded to include a set of conceptually-related expanding search terms.

SUMMARY OF THE INVENTION

The present invention generally provides methods, articles of manufacture, and systems for searching collections of data using expanded term searching.

One embodiment provides a method for context-sensitive searching of fields of a data repository using multiple levels of term expansion. The method generally includes receiving, from a user, a query containing at least one condition for searching at least one field of the data repository, wherein the at least one condition includes at least one base search term, obtaining one or more parameters associated with the base search term, obtaining a level of expansion based on the one or more parameters associated with the base search term, obtaining, based at least in part on the level of expansion, one or more expanded search terms, and modifying the query to contain one or more conditions based on the one or more expanded search terms.

Another embodiment provides a method for searching fields of a data repository using multiple levels of term expansion. The method generally includes receiving, from a user, a query containing at least one condition for searching at least one field of the data repository, wherein the at least one condition includes at least one base search term, obtaining a level of expansion associated with the base search term, obtaining, based on the base search term and the associated level of expansion, one or more expanded search terms, and modifying the query to contain one or more conditions including the one or more expanded search terms.

Another embodiment provides a method for context-sensitive searching of fields of a data repository. The method generally includes receiving, from a user, a query containing at least one condition for searching at least one field of the data repository, wherein the at least one condition includes at least one base search term, obtaining, based one or more parameters associated with the base search term, one or more expanded search terms, and modifying the query to contain one or more conditions based on the one or more expanded search terms.

Another embodiment provides a computer-readable medium containing an executable component for searching fields of a data repository using multiple levels of term expansion. When executed, the program performs operations generally including providing a first interface allowing a user to build a query containing at least one condition for searching at least one field of the data repository, wherein the at least one condition includes at least one base search term, providing a second interface allowing the user to specify expanded search terms to be associated with the at least one base search term, and prior to executing the query, modifying the query to contain one or more conditions including the one or more specified expanded search terms.

Another embodiment provides a data processing system generally including a collection of data, at least one expanded term repository, and an executable component. The executable component is generally configured to receive a query containing at least one condition for searching the collection of data, obtain, based on at least one base search term included in the at least one condition and at least one parameter indicative of a context of the query, one or more expanded search terms contained in the at least one expanded term repository, and modify the query to contain one or more conditions based on the one or more expanded search terms.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2A is a relational view of software components, including an expanded term repository, according to one embodiment of the present invention.

FIGS. 2B and 2C illustrate an exemplary data repository abstraction component and expanded terms list, respectively, according to one embodiment of the present invention.

FIG. 4 illustrates a list of exemplary application programming interface (API) functions, according to one embodiment of the present invention.

FIGS. 5A-5C illustrate exemplary graphical user-interface (GUI) screens that may be presented to a user, according to one embodiment of the present invention.

DETAILED DESCRIPTION OF THE PREFERRED EMBODIMENTS

Figure 1:
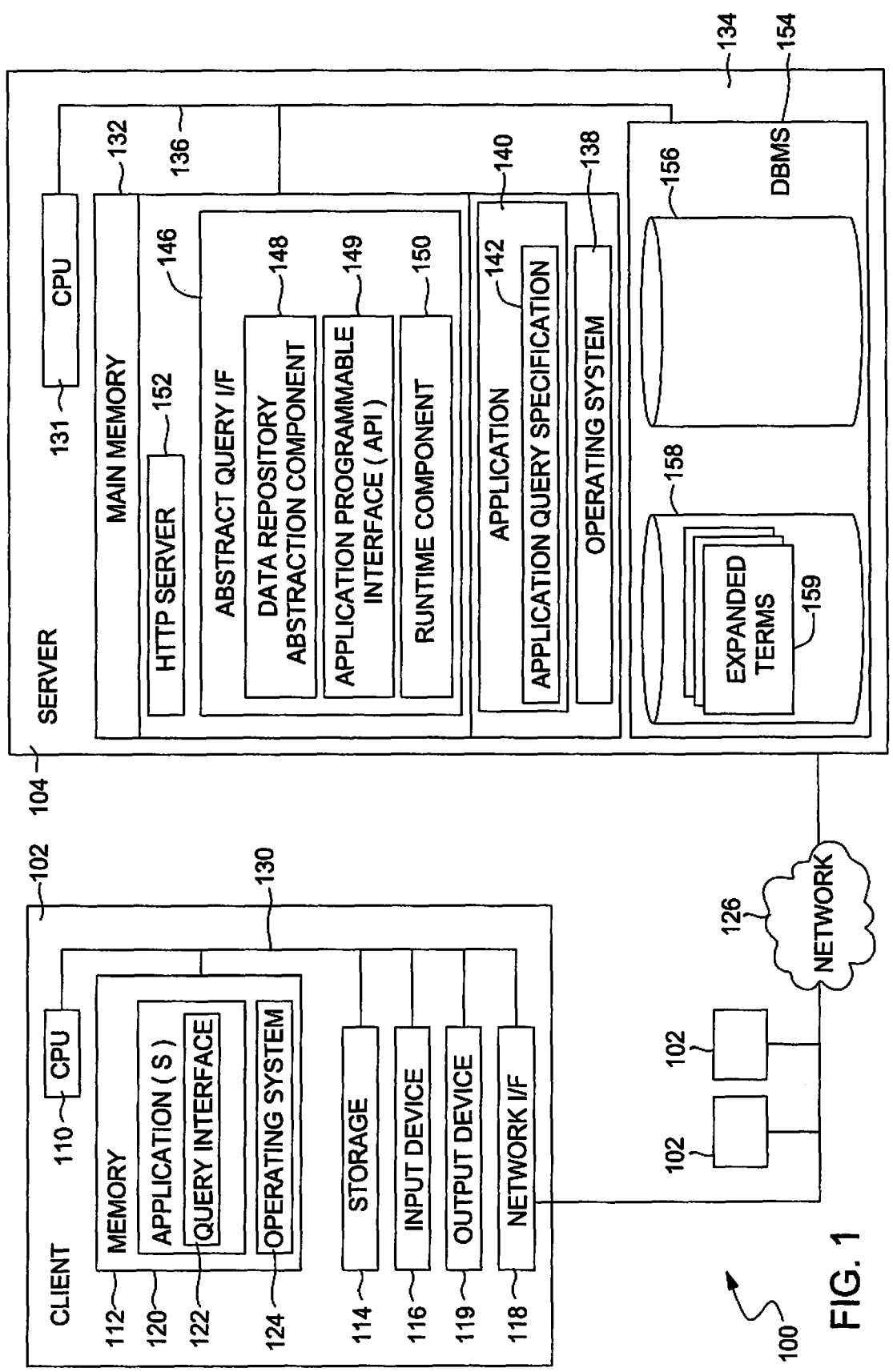
FIG. 1 is a computer system illustratively utilized, according to one embodiment of the present invention.

Embodiments of the present invention are generally directed to a system, method, and article of manufacture for expanding the search terms used in a query. For example, a query including a search condition based on a specified search term may be modified to include additional conditions based on a set of expanded (e.g., conceptually-related) search terms, thus providing some flexibility to conventionally rigid search conditions requiring a specific match with the specified term. The manner and/or extent in which search terms are expanded may be determined based on a context of the query, as determined by any number of factors, such as a specified level of expansion, the fields being searched, a credential of a user issuing the query, and the environment in which the query is to be executed (e.g., the time of day, date, and/or how heavily the system on which the query is to be executed is loaded).

While embodiments may have particular advantage with respect to text searching, those skilled in the art will recognize that the same or similar concepts may be applied to expand search terms used for searching any type data field. Further, while embodiments may be described below with reference to relational database fields, those skilled in the art will also recognize that the same or similar concepts may be applied more generally to expand search terms used for searching any searchable collection of data, such as textual documents, HTML documents, Adobe Acrobat (PDF) documents, or any portions thereof.

In one embodiment of the present invention, a data model may be implemented as a data repository abstraction component containing a collection of abstract representations of physical fields of a searchable database (hereinafter "logical fields"). Thus, this data abstraction model provides a logical view of the underlying database, allowing the user to generate "abstract" queries against the data warehouse without requiring direct knowledge of its underlying physical properties. A runtime component (e.g., a query execution component) performs translation of abstract queries (generated based on the data abstraction model) into a form that can be used against a particular physical data representation.

The concepts of data abstraction and abstract queries are described in detail in co-pending application Ser. No. 10/083,075, entitled "Application Portability And Extensibility Through Database Schema And Query Abstraction," filed Feb. 26, 2002, herein incorporated by reference in its entirety. While the data abstraction model described herein provides one or more embodiments of the invention, persons skilled in the art will recognize that the concepts provided herein can be implemented without such a data abstraction model while still providing the same or similar results.

One embodiment of the invention is implemented as a program product for use with a computer system such as, for example, the computer system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Environment

FIG. 1 shows an exemplary networked computer system 100, in which embodiments of the present invention may be utilized. For example, embodiments of the present invention may be implemented as a program product for use with the system 100 (e.g., as part of a query building interface 122 or a query execution component 150) to perform expanded term searching via a data repository abstraction (DRA) component 148, to access data in one or more databases 156. As will be described in greater detail below, the abstract queries may be expanded to include conditions based on one or more sets of expanded search terms 159 (illustratively shown in an expanded term repository 158) related to search terms in the abstract queries.

The expanded term repository 158 may contain different (e.g., context-specific) sets of expanded terms for each search term, for example, with different sets corresponding to different levels of expansion, a user's credentials (e.g., a user ID or role), and/or some other parameter, such as the specific field being searched. In other words, while a set of expanded terms corresponding to a higher level of expansion will typically have more expanded terms than a set of expanded terms corresponding to a lower level of expansion, different sets of expanded terms associated with the same base term may be organized differently (e.g., other than based on just the number of search terms) and associated with other types of parameters. As will be described in greater detail below, for some embodiments, a plurality of expanded term repositories 158 may be used to hold different sets of expanded terms, for example, with each being used in a different context.

As illustrated in FIG. 1, the system 100 generally includes client computers 102 and at least one server computer 104, connected via a network 126. In general, the network 126 may be a local area network (LAN) and/or a wide area network (WAN). In a particular embodiment, the network 126 is the Internet. For other embodiments, however, the methods described herein may be performed on a single (e.g., non-networked) computer system.

As illustrated, the client computers 102 generally include a Central Processing Unit (CPU) 110 connected via a bus 130 to a memory 112, storage 114, an input device 116, an output device 119, and a network interface device 118. The input device 116 can be any device to give input to the client computer 102. For example, a keyboard, keypad, light-pen, touch-screen, track-ball, or speech recognition unit, audio/video player, and the like could be used. The output device 119 can be any device to give output to the user, e.g., any conventional display screen. Although shown separately from the input device 116, the output device 119 and input device 116 could be combined. For example, a client 102 may include a display screen with an integrated touch-screen or a display with an integrated keyboard.

The network interface device 118 may be any entry/exit device configured to allow network communications between the client 102 and the server 104 via the network 126. For example, the network interface device 118 may be a network adapter or other network interface card (NIC). If the client 102 is a handheld device, such as a personal digital assistant (PDA), the network interface device 118 may comprise any suitable wireless interface to provide a wireless connection to the network 126.

Storage 114 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips.

Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing the query building interface 122, such as a browser program, that, when executed on CPU 110, provides support for building queries based on the DRA component 148. In one embodiment, the query interface 122 includes a web-based Graphical User Interface (GUI), which allows the user to display Hyper Text Markup Language (HTML) information. More generally, however, the query interface 122 may be any program (preferably GUI-based) capable of exposing a portion of the DRA component 148 on the client 102 for use in building queries. As will be described in greater detail below, queries built using the query interface 122 may be sent to the server 104 via the network 126 to be issued against one or more databases 156.

The server 104 may be physically arranged in a manner similar to the client computer 102. Accordingly, the server 104 is shown generally comprising a CPU 131, a memory 132, and a storage device 134, coupled to one another by a bus 136. Memory 132 may be a random access memory sufficiently large to hold the necessary programming and data structures that are located on the server 104.

The server 104 is generally under the control of an operating system 138 shown residing in memory 132. Examples of the operating system 138 include IBM OS/400®, UNIX, Microsoft Windows®, and the like. More generally, any operating system capable of supporting the functions described herein may be used. As illustrated, the server 104 may be configured with an abstract query interface 146 for issuing abstract queries (e.g., received from the client application 120) against one or more of the databases 156.

In one embodiment, elements of a query are specified by a user through the query building interface 122 which may be implemented as a browser program presenting a set of GUI screens for building queries. The content of the GUI screens may be generated by application(s) 140. In a particular embodiment, the GUI content is hypertext markup language (HTML) content which may be rendered on the client computer systems 102 with the query building interface 122. Accordingly, the memory 132 may include a Hypertext Transfer Protocol (http) server process 152 (e.g., a web server) adapted to service requests from the client computer 102. For example, the server process 152 may respond to requests to access the database(s) 156, which illustratively resides on the server 104. Incoming client requests for data from a database 156 invoke an application 140 which, when executed by the processor 130, perform operations necessary to access the database(s) 156. In one embodiment, the application 140 comprises a plurality of servlets configured to build GUI elements, which are then rendered by the query interface 122. Generally speaking, the application programmable interface (API) 149 contains a set of programs that perform a variety of term expansion related functions.

As previously described, abstract queries containing conditions based on a specified search term may be supplemented with expanded conditions based on a set of expanded search terms 159 (from the expanded term repository 158) related to the specified search term. In other words, the expanded terms repository 158 may act, in effect, as a thesaurus during the building and/or issuance of queries, in an effort to ensure related terms and values are not excluded, for example, due to use of different term. For example, the expanded terms repository 158 may be used to include generally synonymous terms (e.g., "cancer," "tumor," "malignant," and the like), in an effort to ensure certain values of interest are not excluded merely by a user's choice of terms.

The expanded term repository 158 may reside in the same database that the query is being executed against, or it may be a separately stored database. The expanded term repository 158 may be maintained, for example, by periodically adding or deleting terms from expanded terms sets 159. One technique to identify terms to be included in an expanded term set is to examine the co-occurrence of terms in the database 156. In other words, a high co-occurrence of one or more terms with a common search term (e.g., the one or more terms often occur in the same field with the common search term) may indicate the terms are conceptually related. Accordingly, for some embodiments, the expanded term repository 158 (or plurality of expanded term repositories 158) may be periodically updated based on the co-occurrence of terms. As an alternative, or additionally, the expanded term repository 158 may be "manually" maintained, for example, by an administrator specifying expanded search terms (related to a base search term), via a set of administrative tools (e.g., GUI screens).

An Exemplary Relational View

Figure 2B:
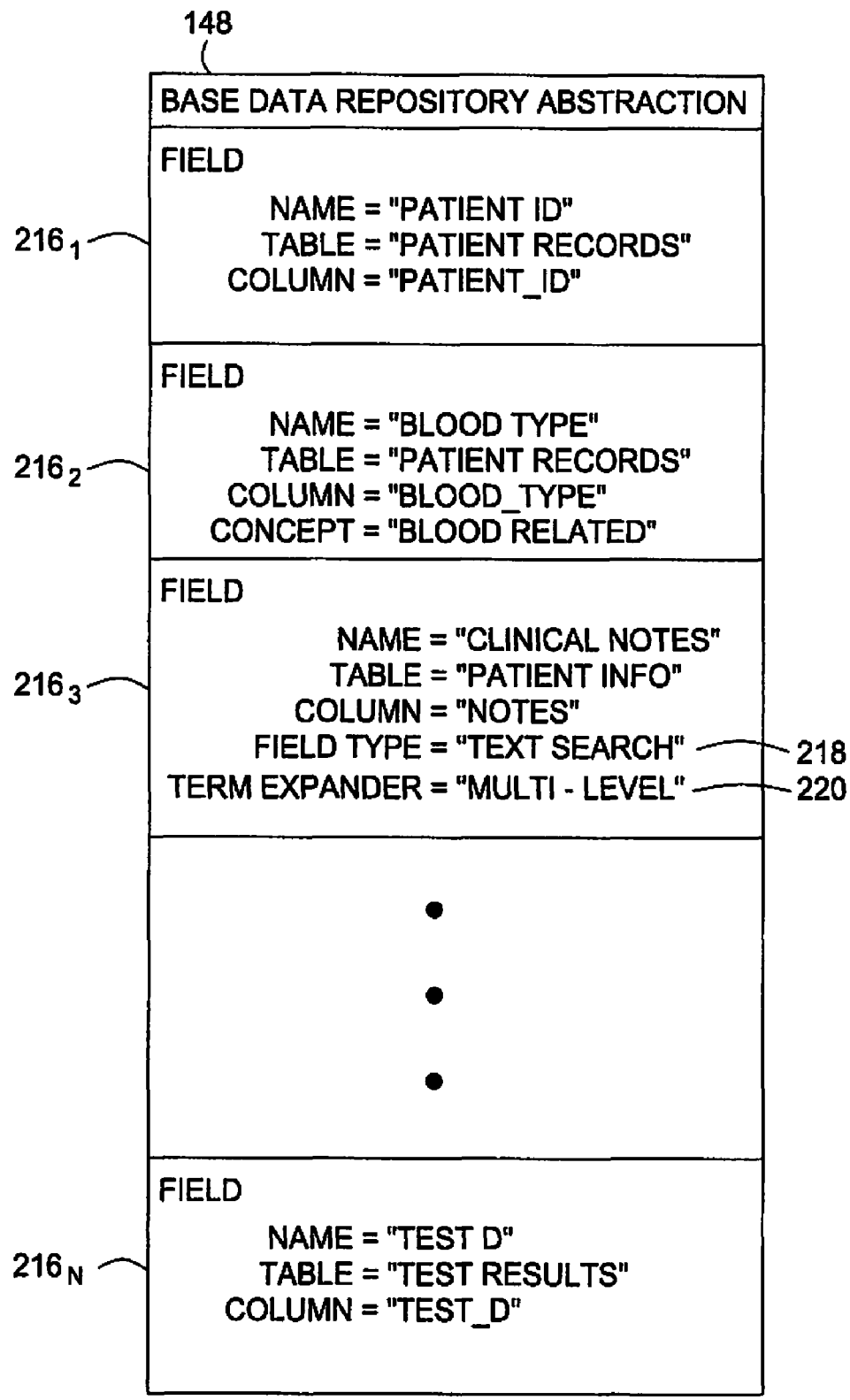

Operation of various components of the abstract query interface 146, according to one embodiment of the present invention, may be further described with reference to FIGS. 2A-2C. FIG. 2A illustrates a relational view of a client application 120 and query execution runtime component 150, according to one embodiment of the invention. As shown, the application 120 may issue an abstract query 202 (e.g., via the query building interface 122 shown in FIG. 1). The abstract query 202 may include at least one condition (e.g base condition 204) base on a search term (e.g., a base term 206 specified via the query building interface 122).

As previously described, the abstract query 202 may be executed by the query execution component 150. However, prior to execution, the abstract query 202 may be modified (e.g., via the query building interface 122, query execution component 150, or other executable component) to include additional conditions 210, based on expanded terms 212, for example, related to the base term 206 and stored in the expanded term repository 158.

As previously described, in the exemplary abstract data model, the logical fields are defined independently of the underlying data representation being used in the DBMS 154, thereby allowing queries to be formed that are loosely coupled to the underlying data representation 214.

For example, as illustrated in FIG. 2B, the DRA component 148 includes a set of logical field specifications 216 that provide abstract representations of corresponding fields in a physical data representation 214 of data in the one or more databases 156 shown in FIG. 1. Each logical field specification 216 may include various information used to map the specified logical field to the corresponding physical field, such as field names, table names, and access methods (not shown) describing how to access and/or manipulate data from the corresponding physical field in the physical data representation 214. The physical data representation 214 may be an XML data representation $214_1$, a relational data representation $214_2$, or any other data representation, as illustrated by $214_N$. Therefore, regardless of the actual physical data representation 214, a user may generate an abstract query 202 based on the logical fields defined by the logical field specifications 216, in order to access data stored therein.

The logical field specifications 216 may also include information related to term expansion. For example, a field specification $216_3$ may include a field type 218 and term expander 220, which may indicate whether or not the logical field is text searchable and what types of term expansion (e.g., expansion levels) are associated with that logical field, respectively. Other attributes in field specifications 216 may also be used to determine what type of term expansion is used, such as a concept attribute (e.g., "Blood Related" shown in field specification $216_2$) that may be used to select a set of expanded terms Referring back to FIG. 2A, the query execution component 150 is generally configured to execute the expanded abstract query 208 by transforming the expanded abstract query 208 into a concrete query compatible with the physical data representation (e.g., an XML query, SQL query, etc). The query execution component 150 may transform the expanded abstract query 208 into the concrete query by mapping the logical fields of the expanded abstract query 208 to the corresponding physical fields of the physical data representation 214. The mapping of abstract queries to concrete queries, by the query execution component 150, is described in detail in the previously referenced co-pending application Ser. No. 10/083,075.

As previously described, each base term 206 may have one or more corresponding sets of expanded terms (e.g., corresponding to different levels of expansion). Further, for some embodiments, the types of sets of related terms may be determined, at least in part, by the field being searched. For example, depending upon the term expansion attribute 220, terms used to search a logical field may have a single or multiple levels of expansion (e.g., one or more sets of expanded terms). If the field is multi-level expandable, then the base term may be expanded differently with different levels of expansion. For example, as illustrated in the exemplary set of expanded terms shown in FIG. 2C, a base term such as cancer, may have only two associated "low level" expanded terms and five associated "high level" expanded terms. Of course, the different expansion levels and the number of associated expanded terms shown are exemplary only, and the exact number of levels and the associated expanded terms may vary, for example, depending on the term, depending on a particular embodiment, and may even vary with time (e.g., as the expanded term repository 158 is periodically or otherwise updated). The expansion level to be used for any particular query may be set as a default value, specified by a user issuing the query, and or determined by one or more other parameters, such as one or more credentials of the user (e.g., user ID, a role of the user, etc.).

An Exemplary Method

Figure 3A:
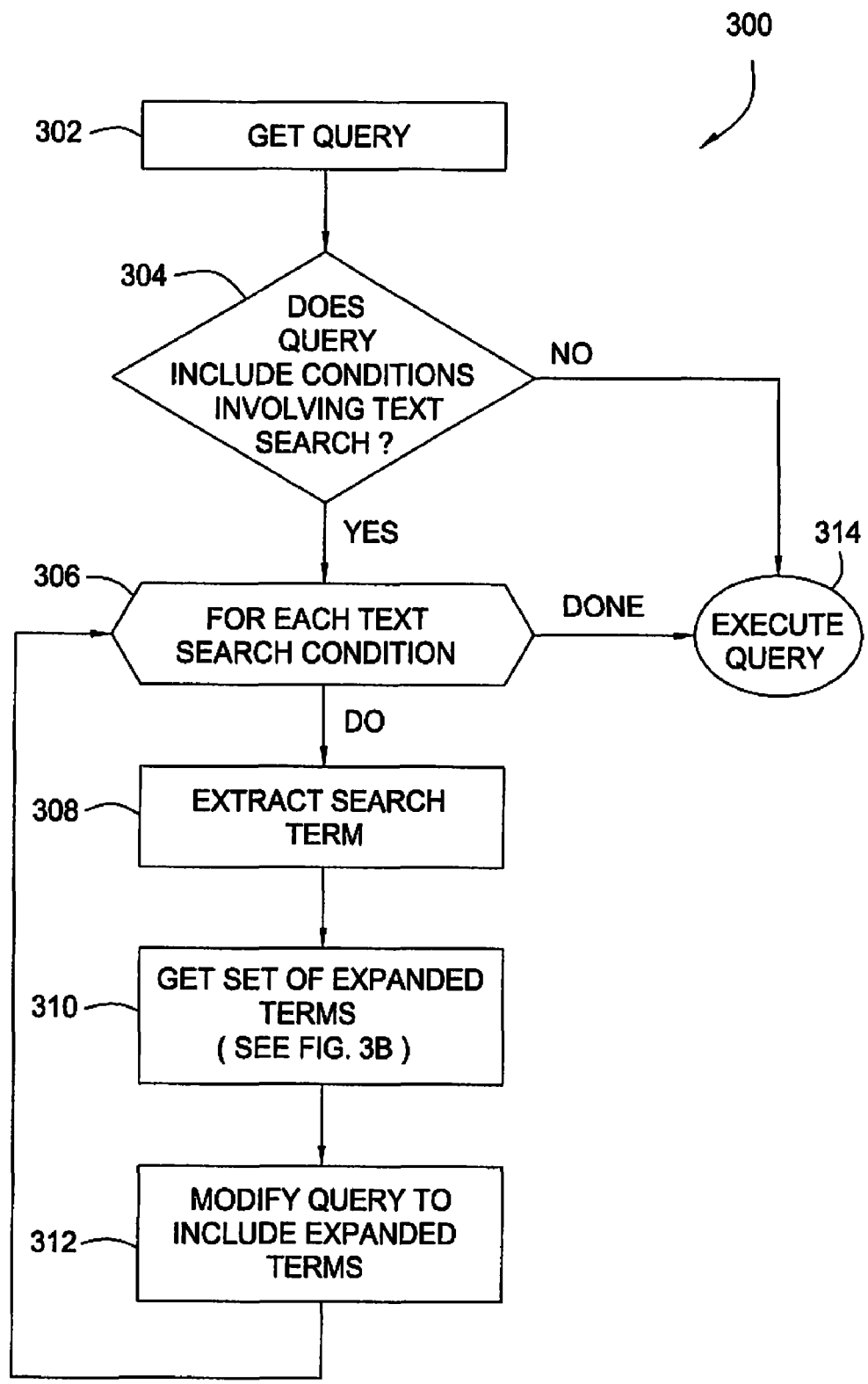
FIG. 3A is a flow chart illustrating exemplary operations for generating an expanded query, according to one embodiment of the present invention.

FIG. 3A illustrates exemplary operations 300 that may be performed to expand a query (e.g., an abstract query or other type query) based on context. For example, the operations may be performed by the application program 120 (e.g. the query building interface 122) or runtime component 150. While the operations 300 illustratively include operations for expanding conditions for searching text, it should be appreciated that the same or similar operations may also be performed to expand conditions for searching any other type field. Similarly, the operations may apply to abstract queries involving logical fields or "concrete" queries involving physical fields.

The method 300 begins at step 302, by receiving a query. At step 304, the query is parsed to determine whether the query includes conditions involving text search. If the query contains text searching conditions, a loop of operations (308-312) to be performed for each text search condition is entered at step 306. For each text search condition in the query, the system extracts the base search term at step 308 and, at step 310, a set of expanded terms related to the base search term is retrieved, based on context. Depending on the embodiment, the set of expanded terms may be retrieved from one or more repositories of expanded terms.

For example, for some embodiments, multiple expanded term repositories may be maintained and from which repository expanded terms are selected may depend upon one or more parameters indicative of the context of the query. Examples of parameters indicative of the context of the query include, but are not limited to, an administrator configuration that specifies one or more repositories of expanded terms available for term expansion, one or more user credentials, and a level of expansion. The level of expansion may be specified by a user or calculated/selected based on one or more other parameters described herein. A set of expanded terms may also be selected based on particular search criteria, such as a field or table name, or a particular instance value included in a search condition. Further, in some cases, a user-specified set of terms for expanding a base search term may be provided.

Environmental Term Expansion

Further, for some embodiments, the exact set or number of terms used for term expansion may be, alternatively or additionally, determined based on one or more parameters indicative of a state of an environment in which the query is to be executed. For example, one parameter indicative of a state of an environment in which the query is to be executed may be a workload of the system on which the query is to be processed. For example, it may be desirable to limit term expansion to fewer terms when the system is heavily loaded, as determined by available system resources, such as available processing power, memory and/or network bandwidth. For some embodiments, a level of expansion may be selected based on any combination of one or more of these environmental parameters.

However, the environment in which the query is to be executed may refer, not only to the computer system and/or network in which the query is to be executed, but also to the time (time of day and/or date) when the query is to be executed. For example, it may be desirable to limit term expansion to fewer terms during peak operating times than are used during off-peak operating times. Peak and off-peak operating times may be user defined as certain dates and/or times of day (e.g., overnight and weekends may be defined as off-peak). Therefore, for some embodiments, a level of expansion may be determined, at least in part, based on the time of day and/or date.

Further, for some embodiments, in addition to, or instead of, retrieving expanded terms from a repository, expanded terms may be generated by an algorithm that receives, as input, a search term. For example, the algorithm may take a base term and expand the base term by modifying the base term to include singular and plural, different tenses, different types of words (e.g., the term test may be expanded to include tests, testing, tester, tested, and the like). The algorithm may also receive, as input, a parameter indicative of the context of the search, which may affect the number of expanded terms generated.

Regardless of how the expanded terms are obtained, at step 312, the query is modified to include conditions based on the expanded terms. Once the operations 308-312 have been performed for each text search condition, the modified query may be executed at step 314. As will be described in greater detail below, instead of, or in addition to, executing the query, the query may be saved for later execution.

Figure 3B:
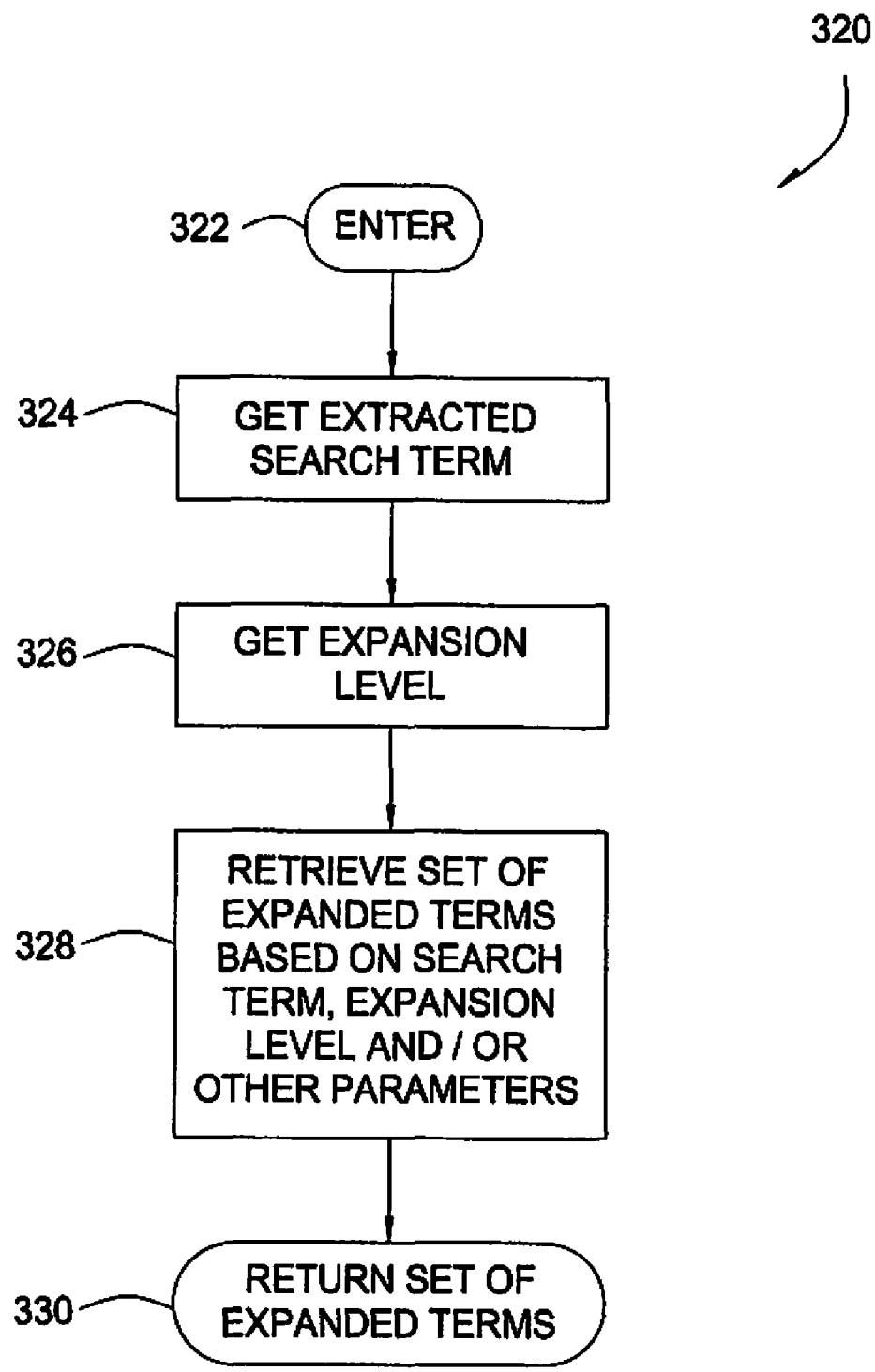
FIG. 3B is a flow chart illustrating exemplary operations for generating an expanded terms set, according to one embodiment of the present invention.

As previously described, depending on the embodiment, any combination of a number of different parameters may be examined to determine what set of expanded terms should be used for expansion. For example, FIG. 3B illustrates exemplary operations 320 for selecting a set of expanded terms based on (at least) the base search term and an expansion level. The operations 320 begin at step 322, for example, by detecting a search condition involving a field for which term expansion is enabled and, at step 324, a search term is extracted from the condition. At step 326, an expansion level is obtained, for example, as a default value, specified by a user, or determined by one or more parameters indicative of a context of the query, as previously described. At step 328, a set of expanded search terms is retrieved based on the search term, expansion level (and/or other parameters). At step 330, the set of expanded terms is returned.

Exemplary Application Programming Interface

As previously described, a variety of term expansion related functions may be performed via one or more application programming interface function calls. For example, FIG. 4 illustrates a table 400 of exemplary functions that may be included in the API 149, according to one embodiment of the present invention, and used to implement some of the methods described herein.

As illustrated, the API 149 may include functions allowing the system to retrieve a set of expanded terms (e.g., GetExpandedTerms), given a specified search term and level of expansion, and functions returning the available levels of expansion for a given term (e.g., GetExpansionLevels). The API 149 may also include a set of functions that allow for maintenance of the expanded term repository 158, for example, by an administrator. For example, the API may include functions for adding new sets of expanded terms to the expanded term repository 158, given a search term, expansion level, and list of expanded terms. and expansion level (e.g., BuildExpandedTerms), as well as functions for adding or deleting terms from existing sets of expanded terms (e.g., AddExpandedTerms and DeleteExpandedTerms).

Those skilled in the art will realize that the exact API functions and function names provided, parameters passed to and from the functions, and the exact functionality performed thereby may vary widely with different implementations, and that various functions may be combined in a single function or separated into separate functions as a designer sees fit. Therefore, while the following references may refer to the specific exemplary functions listed in FIG. 4, it should be understood that actual sequences and functions used to perform any of the following operations will likely vary widely with different implementations. Various sequences of one or more of the API functions may be called to accomplish some the operations described herein, for example, for generation of GUI screens and/or for expanded queries built using GUI screens, such as the GUI screens described below, with reference to FIGS. 5A-5C.

Exemplary Graphical User Interface

Figure 5A:
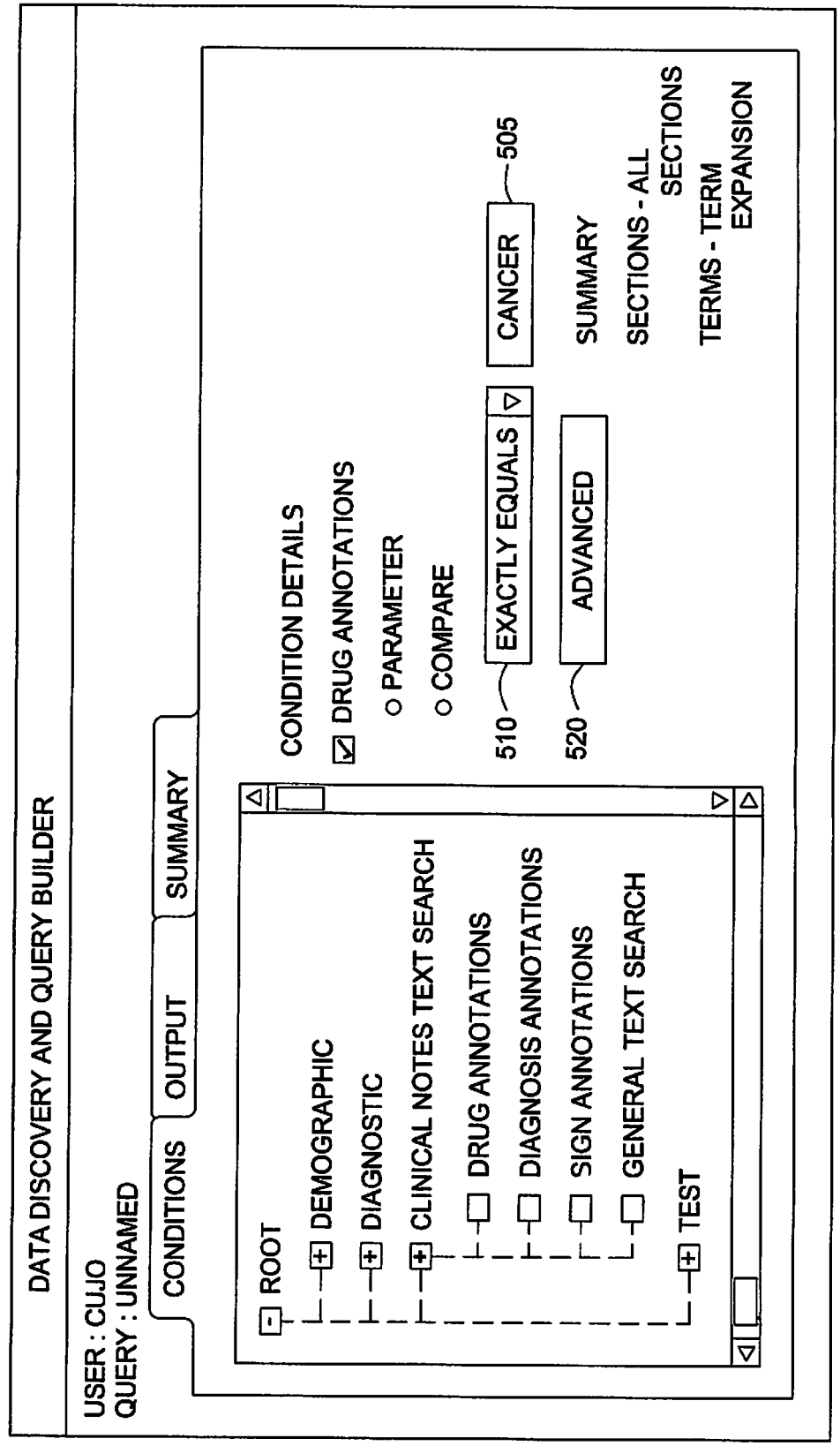

FIG. 5A shows an exemplary GUI screen 500 through which a user can build and customize a query. In the process of adding a condition to a query, the user may enter a search term, such as "cancer" in a text box 505 and choose from the options given in the dropdown menu 510 to specify how the search term should be treated in the query (e.g., whether the results should exactly equal, contain, or sound like the search term). The user may also be able to control how the query is expanded to include expanded search terms related to the specified search term.

Figure 5B:
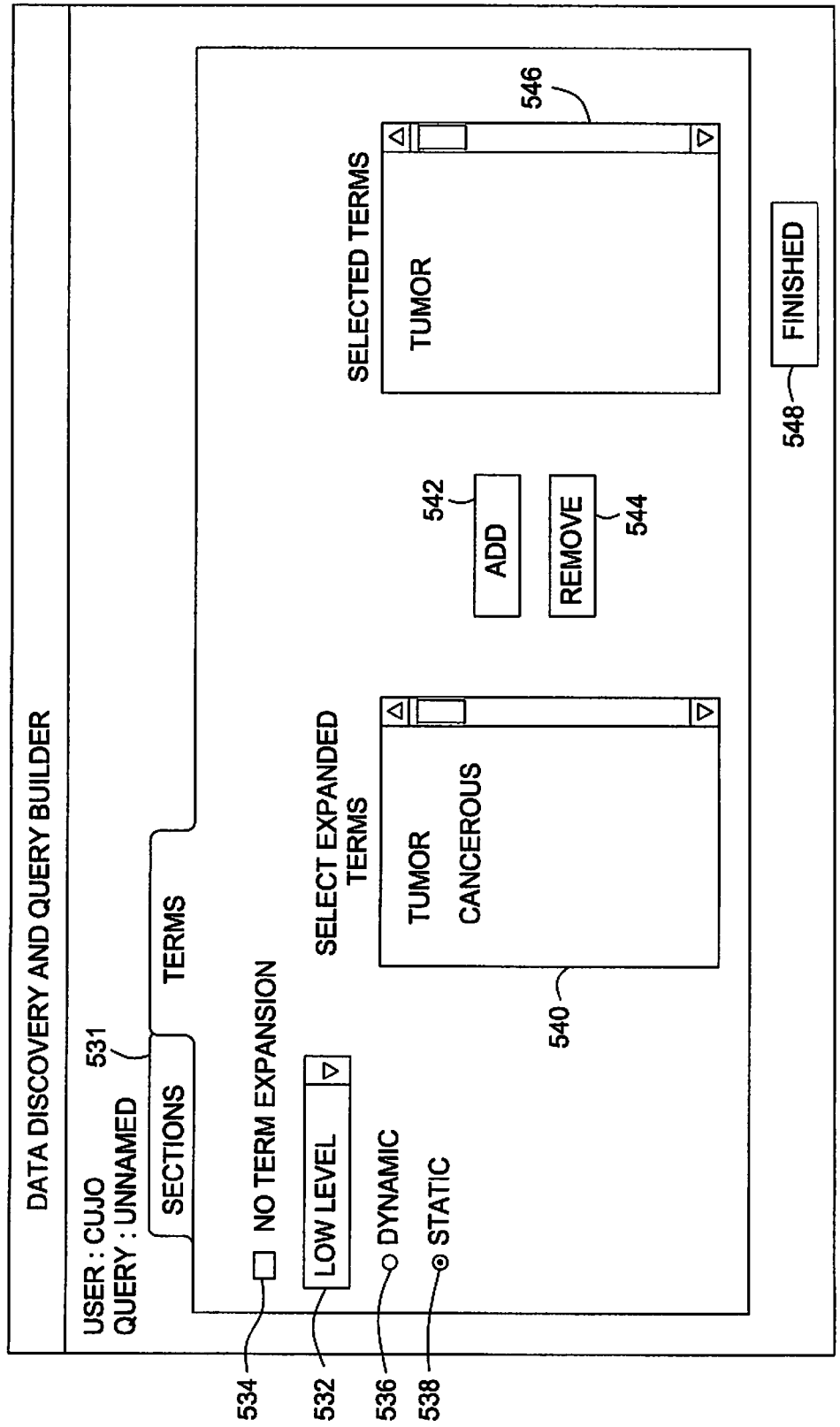

For example, in response to pressing an advanced button 520, the user may be presented with another GUI screen 530 shown in FIG. 5B, allowing the user to customize the term expansion routine. As illustrated, the user may select a desired term expansion level from the dropdown menu 532 (e.g., LOW, MEDIUM, HIGH, etc.), resulting in a corresponding list of expansion terms being displayed in a selection list 540. For example, when selecting a LOW expansion level, only a few additional search terms may be presented, while selecting a HIGH expansion a more comprehensive list of expanded terms may be presented, as shown in FIG. 5C. As illustrated, regardless of the expansion level, the user may also be able to narrow a search by selecting (e.g., via ADD and REMOVE buttons) specific terms from the list 554 to include in the expansion, as well as specify NO TERM EXPANSION.

Additionally, a SECTIONS tab 531 may allow a user to further control or specify context sensitive term expansion. For example, via the SECTIONS tab 531, the user may be able to choose which sections of a document or fields of a database specified term expansion should apply to. In other words, different types of expansion (e.g., different levels, static or dynamic as described below) may be applied depending upon the section or the field being searched, which may be particularly useful for terms that may have different meanings in different contexts.

For example, the term "IN" could be a gene, an abbreviation for Indiana, or the common term which is often a preposition. When running a query, IN may be expanded differently depending upon whether it is run on a gene description section or a state field. In the first instance, IN may be expanded to proteins and genes related to IN, whereas in the second case it could be expanded to list cities or zip codes in Indiana. In this manner, the base term may be expanded according to the context in which it is being searched which, in some cases, may be determined by examining a name of the field or table being searched. For example, if the query involves searching a table or field related to genetic research, the first type of term expansion (gene related) may be appropriate. On the other hand, if the query involves searching a table related to demographic data, the second type of expansion (state related) may be appropriate. In any case, such context-sensitive term expansion may assist in expanding the search term while still focusing the search to the user's desired concept and limiting the results to only those associated with that concept.

Dynamic and Static Term Expansion

In some situations, a set of expanded terms related to a term in a query may be modified (e.g., updated to add new terms based on new relational information, such as the co-occurrence of terms) after the query is built, but before the query is executed. For example, as previously described, queries (or query portions) may be saved for later reuse (e.g., to be executed or modified to form a new query). The concepts of saving and reuse of query portions are described in co-pending U.S. patent application Ser. No. 10/264,188, entitled "SQL Query Construction Using Durable Query Components," filed Oct. 3, 2002, herein incorporated by reference in its entirety. Depending on the situation, it may be desirable for the query, when executed, to be expanded based on the modified set of expanded terms (e.g., to include the most recent relational information). On the other hand, at times the user may be only interested in searching for the exact terms that were present when the query was built (e.g., the user would like to be able to retrieve the same results set).

In an effort to accommodate both situations, embodiments of the present invention may allow a user to specify whether the term expansion should be static (e.g., using the set of expanded terms existing at the time the query was built) or dynamic (using the set of expanded terms existing at the time the query is executed). For example, if static expansion is chosen, the exact set of expansion terms may be saved with the query (or the query may be modified to include conditions base on the exact set of expansion terms prior to saving). On the other hand, if dynamic expansion is chosen, a pointer (or "link") to the set of expansion terms may be generated. The pointer may comprise any suitable type data object, such as a URL, directory path, address, or any other type object, that points to or otherwise identifies the set of expansion terms. In any case, sufficient information to recreate the pointer may be saved with the query such that, when the query is later retrieved, the current set of expansion terms may be retrieved using the pointer. Thus, the current set of expansion terms may reflect any changes made since the query was saved.

Figure 6A:
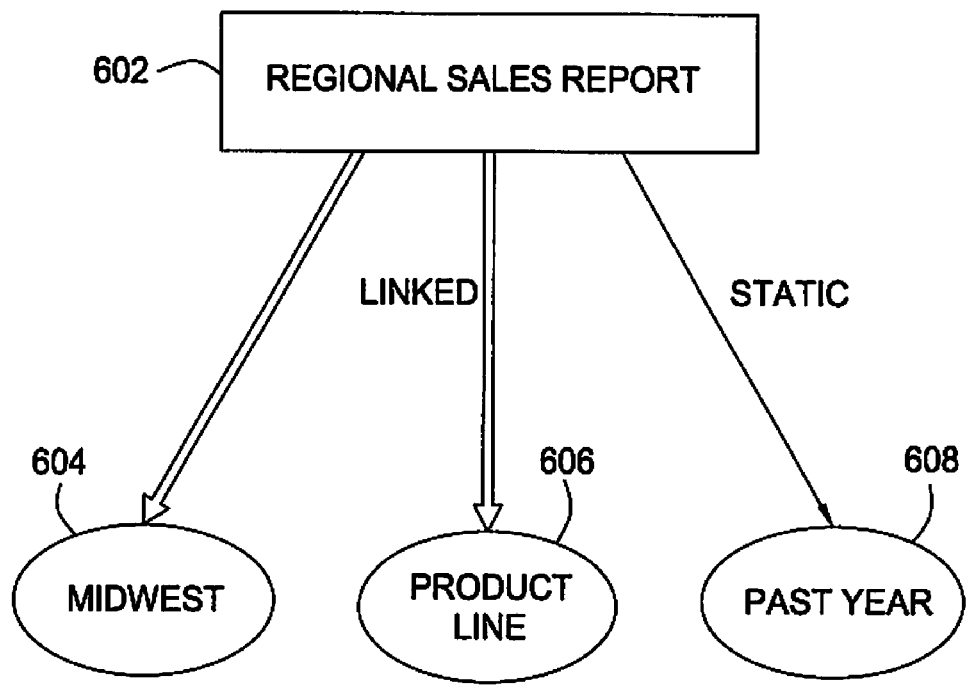
FIG. 6A is a relational view of a saved query condition illustrating the concept of linked and unlinked search terms, according to one embodiment of the present invention.

The effect of dynamic and static linking may be described with reference to FIG. 6A, which illustrates a saved query 602 including conditions with both dynamic links (double lines) and a static link (single line) to different sets of expanded search terms (604-608). As illustrated, the saved query 602 may be used to generate a regional sales report (e.g., for a business enterprise) for a specific product line sold in Midwestern states during the past year. The expanded search terms 604 and 606 may include terms related to states in the Midwest (e.g., a list of states, zip codes, and/or cities) and to different products in a common product line (e.g., different model numbers), respectively, while the expanded search terms 608 may include expanded terms for the last year (e.g., months in the year by name or number).

Figure 6B:
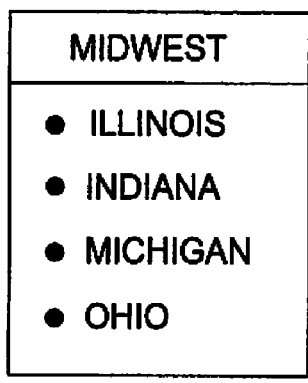
FIGS. 6B and 6C illustrate exemplary sets of expanded terms conceptually related to a common search term, according to one embodiment of the present invention.
Figure 6C:
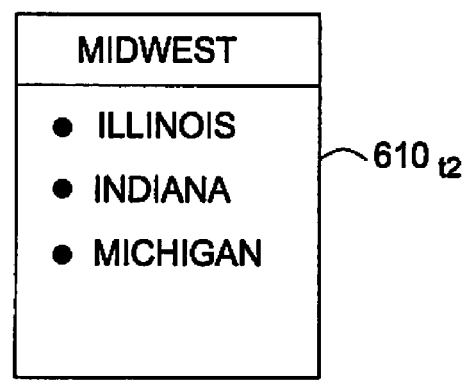

Because the list of states defined to be in the Midwest may occasionally change (e.g., to include or remove Ohio) and the product line may be updated periodically (e.g., to include or remove different model numbers), the saved query 602 may be dynamically linked to expanded terms 604 and 606. FIGS. 6B and 6C illustrate how the expanded terms set associated with Midwest might periodically be updated to add or delete OHIO from the set. For example, when the query is first built (at a time T1), the set of expanded terms for Midwest may include OHIO (shown as $610_{T1}$), while after the query is built (at a time T2), Ohio may be removed from the set of expanded terms for the Midwest (shown as $610_{T2}$), for example, due to a reorganization of Sales Regions. Providing a dynamic link to the set of expanded terms for Midwest ensures that each time the query is executed only the latest expanded term sets would be used. On the other hand, the different months of a year are not likely to change, so the set of extended search terms 608 may be statically linked to the saved query 602.

While the foregoing is directed to embodiments of the present invention, other and further embodiments of the invention may be devised without departing from the basic scope thereof, and the scope thereof is determined by the claims that follow.

What is claimed is:

1. A non-transitory computer-readable storage medium containing a program for searching fields of a data repository using multiple levels of term expansion which, when executed, causes one or more computer processors to perform operations comprising:
   receiving, from a user, a relational database query containing a plurality of conditions, wherein at least one condition is a condition for searching at least one field of the data repository, wherein the at least one condition includes at least one base search term providing a keyword to search for in an unstructured text field of the data repository;
   providing an interface allowing a user to specify a level of expansion associated with the base search term, the level of expansion selected from the defined plurality of levels of expansions ranging from a lowest level of expansion to a highest level of expansion;
   determining one or more parameters specifying at least a credential associated with the user and a role associated with the user;
   providing a plurality of sets of expanded search terms for the base search term, each set corresponding to a different level of expansion of the plurality of levels of expansions, and each set comprising all expanded search terms from any lower level of expansion;
   obtaining the level of expansion associated with the base search term;
   obtaining, based on the base search term, the associated level of expansion, and the one or more parameters, one or more expanded search terms, wherein obtaining the one or more expanded search terms comprises selecting a set of expanded search terms from the plurality of sets of expanded search terms; and
   prior to executing the relational database query, modifying the relational database query to contain one or more additional conditions, wherein each additional condition includes one of the one or more expanded search terms.

2. The non-transitory computer-readable storage medium of claim 1, wherein the base search term corresponds to an instance data value of the at least one field.

3. The non-transitory computer-readable storage medium of claim 2, wherein a number of expanded search terms in each set is dependent on the corresponding level of expansion.

4. The non-transitory computer-readable storage medium of claim 3, wherein the different levels of expansion are determined, at least in part, based on one or more credentials of the user.

5. A non-transitory computer-readable storage medium containing a program for context-sensitive searching of fields of a data repository which, when executed, causes one or more computer processors to perform operations comprising:
   receiving, from a user, a relational database query containing at least one condition for searching at least one field of the data repository, wherein the at least one condition includes at least one base search term;
   determining one or more parameters specifying at least a credential associated with the user and a role associated with the user;
   providing a plurality of sets of expanded search terms for the base search term, each set corresponding to a different level of expansion of a defined plurality of levels of expansions ranging from a lowest level of expansion to a highest level of expansion, and each set comprising all expanded search terms from any lower level of expansion;
   obtaining, based on the one or more parameters associated with the base search term, one or more expanded search terms, wherein obtaining the one or more expanded search terms comprises selecting a set of expanded search terms from the plurality of sets of expanded search terms; and
   prior to executing the relational database query, modifying the relational database query to contain one or more conditions based on the one or more expanded search terms,
   wherein the one or more parameters associated with the base search term further comprise at least a name of the at least one field and different one or more expanded search terms are obtained for the at least one base search term depending on the name of the at least one field.

6. The non-transitory computer-readable storage medium of claim 5, wherein the one or more parameters associated with the base search term comprise a name of a table containing the at least one field.

7. The non-transitory computer-readable storage medium of claim 5, wherein the one or more parameters associated with the base search term comprise a level of expansion.

8. The non-transitory computer-readable storage medium of claim 7, wherein the level of expansion is dependent on one or more other ones of the one or more parameters.

9. A non-transitory computer-readable storage medium containing a program for context-sensitive searching of fields of a data repository using multiple levels of term expansion, when executed, causes one or more computer processors to perform operations comprising:
   receiving, from a user, a relational database query containing a plurality of conditions, wherein at least one condition is a condition for searching at least one field of the data repository, wherein the at least one condition includes at least one base search term providing a keyword to search for in an unstructured text field of the data repository;
   providing a plurality of sets of expanded search terms for the base search term, each set corresponding to a different level of expansion of a plurality of levels of expansions ranging from a lowest level of expansion to a highest level of expansion, and each set comprising all expanded search terms from any lower level of expansion;

obtaining one or more parameters associated with the base search term, wherein the one or more parameters associated with the base search term comprise a userspecified level of expansion selected from the defined plurality of levels of expansions and further include at least a credential associated with the user and a role associated with the user;

obtaining, based at least in part on the user-specified level of expansion and the credential associated with the user and the role associated with the user, one or more expanded search terms, wherein obtaining the one or more expanded search terms comprises selecting a set of expanded search terms from the plurality of sets of expanded search terms; and prior to executing the relational database query, modifying the relational database query to contain one or more additional conditions based on the one or more expanded search terms.

10. The non-transitory computer-readable storage medium of claim 9, wherein the one or more parameters associated with the base search term comprise a name of the at least one field.

11. The non-transitory computer-readable storage medium of claim 9, wherein the one or more parameters associated with the base search term comprise a name of a table containing the at least one field.

12. The non-transitory computer-readable storage medium of claim 9, wherein different one or more expanded search terms are obtained for the at least one base search term depending on the name of the at least one field.

13. A data processing system, comprising:
one or more processors;
a collection of data;
at least one expanded term repository; and
an executable component configured to:
  obtain a relational database query containing at least one condition for searching at least one field of the data repository, wherein the at least one condition includes at least one base search term providing a keyword to search for in an unstructured text field of the data repository;
  determine one or more parameters specifying at least a credential associated with the user and a role associated with the user;
  provide a plurality of sets of expanded search terms for the base search term, each set corresponding to a different level of expansion of a plurality of levels of expansions ranging from a lowest level of expansion to a highest level of expansion, and each set comprising all expanded search terms from any lower level of expansion;
  identify, based on the base search term and the one or more parameters, a set of expanded terms associated with the base search term, wherein identifying the set of expanded search terms comprises selecting a set of expanded search terms from the plurality of sets of expanded search terms;
  generate a pointer to the identified set of expanded search terms; and
  prior to executing the relational database query, modify the relational database query to contain one or more conditions based on one or more expanded search terms retrieved using the pointer.

14. The system of claim 13, wherein the collection of data is a relational database.

15. The system of claim 13, wherein the collection of data is a text document.

16. The system of claim 13, wherein the at least one expanded term repository comprises a single repository containing different sets of expanded search terms associated with the same base term.

17. The system of claim 16, wherein the at least one parameter indicative of a context of the query comprises one of a plurality of available expansion levels, each associated with one of the different sets of expanded search terms associated with the same base term.

18. The system of claim 13, wherein the at least one parameter indicative of a context of the query is indicative of a portion of the collection of data involved in the at least one condition.

19. The system of claim 13, wherein the at least one parameter indicative of a context of the query comprises a name of a table containing the at least one field.

20. The system of claim 13, wherein the executable component is further configured to modify the identified set of expanded search terms after generating the pointer.

21. The system of claim 20, wherein the pointer comprises a directory path to a database.

* * * * *